United States Patent
Starks (10) Patent No.: US 8,399,796 B1
(45) Date of Patent: Mar. 19, 2013

(54) FENCE SYSTEM FOR GUIDING CUTTING TOOL

(76) Inventor: Shelby Starks, Gwynn Oak, MD (US)

(\*) Notice: Subject to any disclaimer, the term of this patent is extended or adjusted under 35 U.S.C. 154(b) by 0 days.

(21) Appl. No.: 13/078,535

(22) Filed: Apr. 1, 2011

Related U.S. Application Data (60) Provisional application No. 61/320,016, filed on Apr. 1, 2010.

(51) Int. Cl.
*B23K 10/00* (2006.01)

(52) U.S. Cl. ......... 219/121.39; 219/121.48; 219/121.58; 266/66; 266/77

(58) Field of Classification Search ............. 219/121.39, 219/121.58, 121.48; 266/47, 48, 58, 66, 266/77, 78
See application file for complete search history.

(56) References Cited

U.S. PATENT DOCUMENTS

| | | | | |
|---|---|---|---|---|
| 2,747,856 A | * | 5/1956 | Burdwood | 266/66 |
| 2,813,710 A | | 11/1957 | Angle | |
| 3,734,477 A | * | 5/1973 | Enfantino | 266/58 |
| 4,381,854 A | | 5/1983 | Bruner | |
| 4,391,433 A | | 7/1983 | Doan | |
| 4,411,411 A | | 10/1983 | Barthelmess | |
| 4,549,725 A | | 10/1985 | Carroll | |
| 4,575,051 A | * | 3/1986 | Kuper | 266/66 |
| 4,695,041 A | | 9/1987 | Clites | |
| 5,856,647 A | | 1/1999 | Luo | |
| 6,620,373 B2 | | 9/2003 | DeCamp | |

\* cited by examiner

*Primary Examiner* — Mark Paschall (57) ABSTRACT

A fence system capable of serving as a guide rail assembly for a cutting tool is provided. The system comprises a main beam with integrated or removable guide inserts interlocked by mechanical means that provide a spacing system for various handheld plasma torches. The inserts are customizable to fit the profile of various torch bodies and provide a precise preset gap for optimized cutting. The main beam can also incorporate storage of consumable parts for the torch as well as additional guide inserts.

16 Claims, 8 Drawing Sheets

FENCE SYSTEM FOR GUIDING CUTTING TOOL

RELATED U.S. APPLICATION DATA

This Application is based on Provisional application No. 61/320,016, filed 1 Apr. 2010.

BACKGROUND OF THE INVENTION

The present invention generally relates to cutting guides and, more particularly, manual plasma torch cutting guides that incorporate a spacer mechanism which serves as both a load bearing or spanning surface and a gap determinant device.

Cutting guides are generally known in the art. Many of the guides in use today were originally designed for gas torches and incorporate wheeled bearings or similar fixed structures that grip the head of a hand held plasma torch, hereinafter referred to as a plasma torch. The function of these designs are to steady the torch in one axis while being work supported, and similar designs have been adapted for use by those working in the art (i.e. U.S. Pat. No. 4,695,041 and the like). That approach, as well as others commercially available rely on having a surface that is both continuous and debris free to ensure a consistent cut, it is not ideal for cutting either expanded metals or metals with voids in and around the cutting path.

Similar approaches (i.e. U.S. Pat. Nos. 4,381,854; 4,391,433 and 2,813,710) incorporate a guide flange, guide bar, or other semi-rigid structural member, hereinafter referred to generally as a guide bar, upon which the torch head rests with or without the aid of a carriage attached to the head that limits the lateral movement. The guide bars are frequently secured to the work piece via magnets and as a result are limited in application to ferrous metals only. Other disadvantages are apparent to those skilled in the art, including among others a lack of rotational control that can lead to displacement of the torch head (i.e. U.S. Pat. No. 4,411,411).

Those approaches that use carriage style carriers often have a horseshoe- or u-groove (as in U.S. Pat. Nos. 6,620,373; 4,411,411; 4,391,433) to simply engage and ride on a guide bar. These particular designs are not desirable for use with a plasma torch, as the head must be clamped firmly in place. Also, should any rotational misalignment of the plasma torch handle relative to the direction of travel occur while cutting, these designs would bind—resulting in blow-back. It is normally desirable to maintain a smooth drawing action across a work piece while operating a plasma torch to provide a clean, consistent kerf width and therefore a precise cut. Particularly in the case of plasma torches, irregular movement causes blow-back into the torch head. Unlike standard gas operated torches, plasma torches are susceptible to fouling of the tips in that event, which in turn increases the consumable usage. Also, these known approaches allow heat generated by the cutting action to unduly affect the rigid member supporting the carrier—directly exposing the rigid member to the flame, or spark—thus warping it longitudinally and affecting the cut accuracy directly during operation of the guide.

Additional approaches known in the art incorporate a floating torch head (i.e. U.S. Pat. No. 4,549,725) that would be difficult to use with a plasma torch as it would require two hands for operation, one to enable the integral safety on the plasma torch and the other to manipulate the carriage assembly along the cutting path. Still other known approaches (i.e. U.S. Pat. No. 4,381,854) provide for no z-axis adjustment, and are thus limited in their use—primarily to particular materials of solid ferrous construction.

Finally, only a very few approaches (i.e. U.S. Pat. Nos. 4,549,725, and 6,620,373) incorporate any kind of work piece clamping or restraint that attempts to address the issue of misshapen stock which may encroach upon the plasma torch tip and result in its fouling. Some plasma tip designs (i.e. U.S. Pat. No. 5,856,647 and the like) have opted to adapt their plasma torch to ride directly on the work piece and as a result are frequently fouled by foreign debris on the work piece, or are impeded in their travel impeded by debris not excluding blown back slag.

Therefore, a need exists for a quickly deployable system that addresses the operational constraints of such devices as a plasma torch and does not suffer the shortcomings of existing designs.

The statements mentioned beforehand do not constitute prior art, but merely provide a background for the present disclosure.

SUMMARY OF THE INVENTION

It is an object of the present invention to provide a system for safely and accurately guiding hand held plasma torches without undue restriction of their unique operating requirements.

It is another object of the present invention to provide a fence system which may be adaptively reconfigured to suit the particular cutting tool and/or other requirements of an intended application.

These and other objects are attained in a fence system for guiding a cutting tool formed in accordance with an exemplary embodiment of the present invention. The fence system generally comprises an elongate main body portion and at least one guide portion provided thereon. The main body portion extends longitudinally between first and second ends, and defines a longitudinally extended side. The guide portion is disposed to extend along the longitudinally extended side of the main body. The guide portion includes at least one member detachably coupled to the main body, which defines a guide surface sectionally contoured to support a cutting tool of preselected head profile in substantially conformed manner. The guide surface maintains the sectional contour for slidably supporting the cutting tool longitudinally thereon.

DETAILED DESCRIPTION OF THE PREFERRED EMBODIMENTS

The main body of the fence system as illustrated in the exemplary embodiments of this disclosure is preferably a lightweight extruded structure provided with laterally opposing guide portions that conform to the profile of a plasma torch head or any other such tool/device needing accurate support and guidance during a work piece cutting action. Preferably, at least one of the guide portions is defined at least in part by a replaceable insert coupled to extend longitudinally along a side or edge of a main structural body. The insert may be replaced with another which defines a differently configured guide portion for slidably supporting and guiding a torch head or other part of the given cutting device having a different profile.

Additional inserts disposed in inter-lockable manner along the long axis of the structure would make alternative guide portions available on the same structure. This would also expand versatility, providing additional means for mechanically attaching differently configured inserts that would further accommodate different models of plasma torches, allowing for both tip gap spacing variation and a change in body size concurrently. Accordingly, an adaptively reconfigurable fence system is realized to suit various head profiles for the particular torch or other cutting tool to be used.

Preferably, the structural body is provided with engagement portions formed to extend longitudinally along a pair of laterally opposed side edges for detachably engaging the inserts. In the embodiments shown, such engagement portions include channels each suitably configured to receive a mated part of one or more inserts. One of the channels is preferably angled in such a manner that when an insert for a given plasma torch is inter-locked thereto, the insert guides the torch substantially at a perpendicular orientation relative to the work piece. The opposing channel is preferably angled to such a degree as to provide a plasma torch orientation that allows for plate beveling, as determined by the insert chosen.

Further embodiments include a main structural body having an inner core formed with a plurality of cavities, and configured with sufficient rigidity to reduce deflection should it be subjected to a mechanical load. The plural cavity structure demonstrates a reduction in the total deflection of a differentially applied thermal load through mass isolation of the outward facing channels. Internal cavities within the main body in such embodiments may be shaped and dimensioned to provide internal compartments for consumables storage within the body. The lower surface of the body is preferably configured with a plurality of slots for the additional placement of friction enhancing materials and magnetically attractive materials to prevent slip relative to the work piece, and thereby improve the lateral stability of the guide portions.

Other alternate embodiments incorporate ball bearing unidirectional rollers placed along the lower surface of the body which may be retracted via an operator catch located on the upper surface of the body. This offers the operator a choice of engagement methods: retracted fully, or extended with a spring pressure great enough to support the weight of the tool to allow for quick placement of larger guides.

Still other alternate embodiments of the present invention utilize inserts that interlock with the main body to maintain precise spacing (gap) between the plasma torch tip being guided and the work piece. Those inserts may be configured in numerous ways to provide conforming support for the body of a specific plasma torch head while maintaining a suitable degree of stability, tip gap spacing, load dispersion, and slag or debris diversion. The inserts are preferably formed by extrusion to each uniformly provide along its length a guide surface shape which closely reflects the profile of at least a portion of the given plasma torch head. The conforming support provided thereby not only offers precise tip gap spacing, but increases the support surface area (as opposed to a flat non-conforming support surface, for instance) against which the torch head body rests while sliding over the work piece. The guide surface of the inserts may be applied with a friction reducing coating, non stick coating specifically for slag reduction or a combination of both with the intent of increasing the smooth drawing action of the plasma torch head. Should the plasma torch profile have a horizontally dispensed surface large enough to collect slag and impede the smooth travel of the torch, a gutter for slag collection may be placed within the radius of the inner edge of the guide surface to provide an easement or collection pocket for the excess slag.

Still further alternate embodiments of the inserts include features for enhancing thermal expansion control and electrical isolation. The mechanical negative of the system's main structural body enables a degree of thermal isolation from the heat generated by the cutting action due to the joint. That joint in the tool could be made larger or smaller to tune the thermal characteristics of the assembly and allow for excessive longitudinal expansion without jamming in the joint.

Further alternate embodiments of the main structural body include features for consumables storage in the form of trays molded into the end caps, which extend into one or more of the main structural body's internal cavities. The end caps snap into place preferably utilizing a friction locking or a mechanical negative button assembly.

Figure 1:
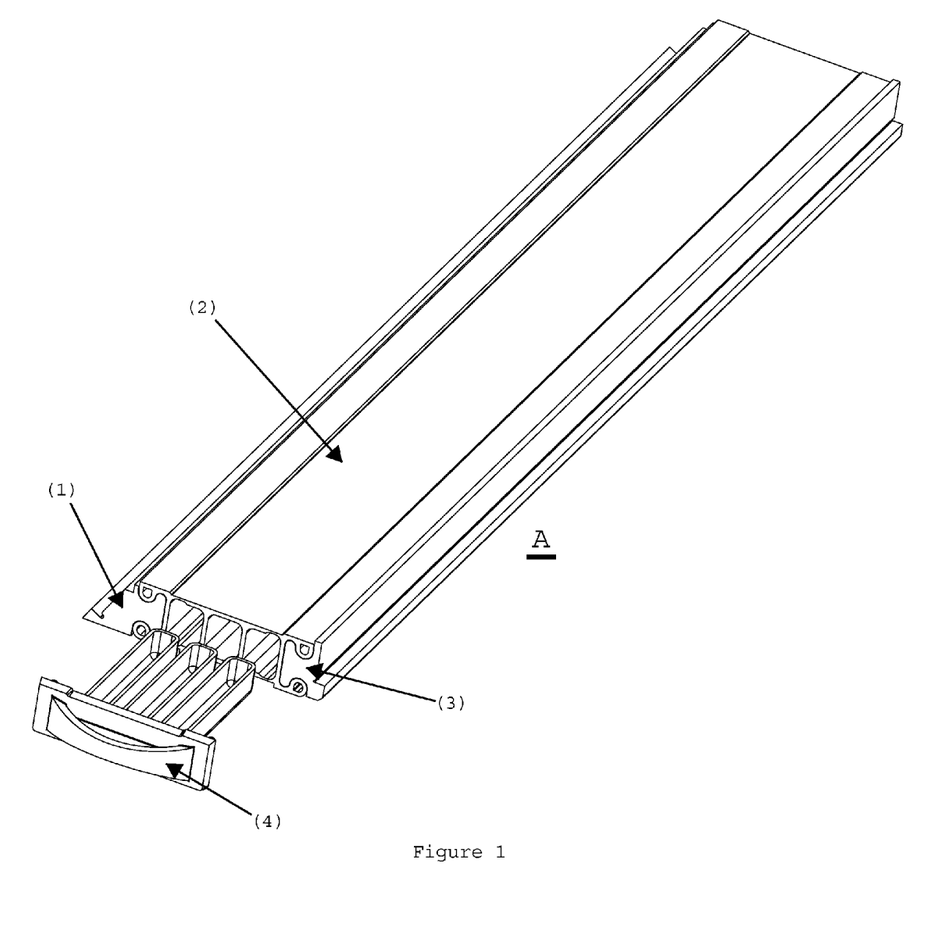
FIG. 1 is an illustrative perspective view of a plasma guide formed in accordance with an exemplary embodiment of the present invention, with a main body (2), angled insert (1), straight insert (3), and accompanying shock absorbing storage tray (4).

FIG. 1 illustrates a fence system A for guiding a plasma torch formed in accordance with an exemplary embodiment of the present invention. System A includes a main body (2) with replaceable inserts (1, 3) respectively configured to orient a plasma torch head 6 in perpendicular or angular manner as to produce a corresponding severance cut through the work piece. System A includes one or more end caps (4) each preferably having an integrated handle to provide for ease of handling by the operator while wearing large restrictive gloves. The end cap (4) may be constructed to provide shock absorption to the main body when closed thereagainst, and with a removable multi bay storage tray extending therefrom to provide a drawer-like structure. The storage trays, when stowed, extend longitudinally inward into the multiple cavities formed in the main body (2).

Figure 2:
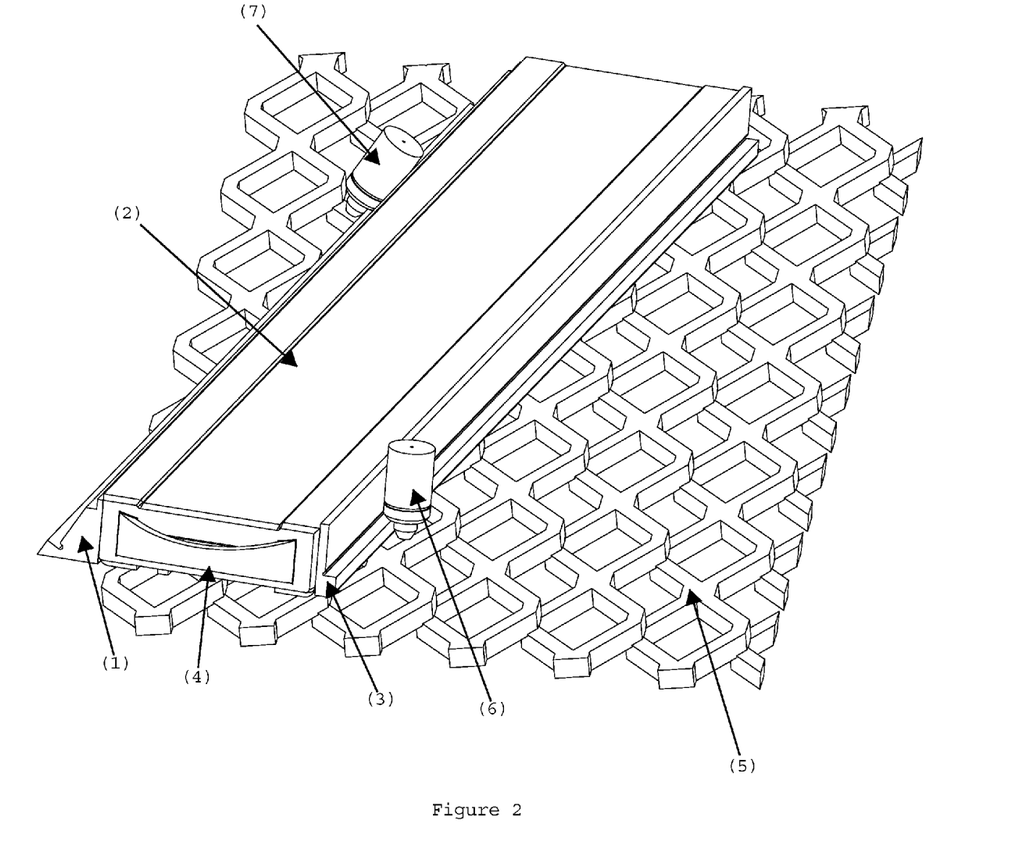
FIG. 2 is an illustrative perspective view of the plasma guide of FIG. 1, disposed on top of a section of expanded metal (5) with two plasma heads (6, 7) illustrated without their respective handles.

FIG. 2 illustrates how system A supports different plasma torch or other such cutting heads (6, 7) to remain above the work piece at a predetermined height (gap spacing) to facilitate the smooth cutting action of irregular, porous, or dirty work pieces (5). Plasma torch heads (6, 7) of a MILLER SPECTRUM series manual plasma torch are illustrated as an exemplary model of torch heads that may be suitably guided by system A. It is understood that other models of manual plasma torches are included in the scope of this disclosure incorporating alterations in insert configuration to accommodate the correct requirements for gap, support, and work piece clearance as needed.

Figure 3:
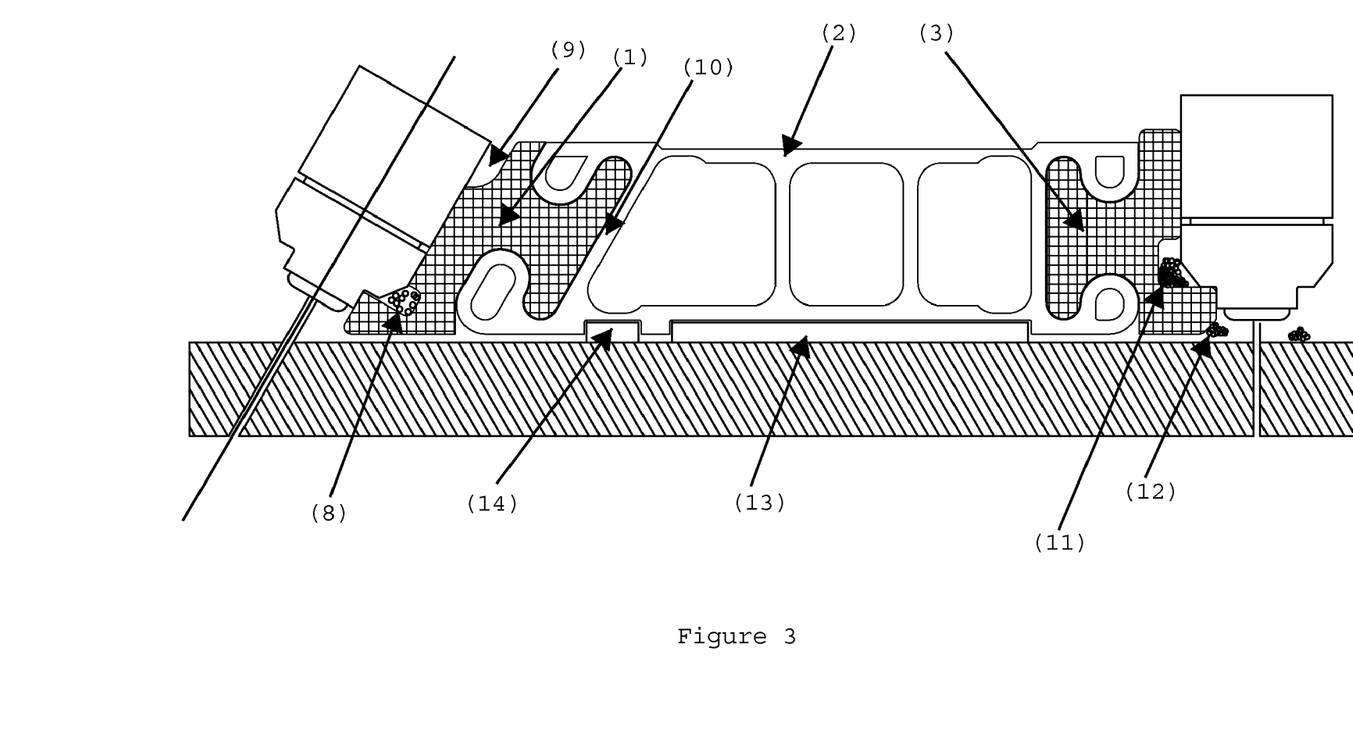
FIG. 3 is a cross sectional view of a main body (2) formed in accordance with an alternate embodiment of the present invention, with angled side (10), friction enhancing material (13, 14), torch body clearance recess (9), and slag diversion slots (8, 11).

FIG. 3 illustrates a cross sectional view of a multi cavity main body with guide inserts (1,3) in place that are cross hatched for delineation, that could be made of an aluminum extrusion, or other heat resistant material. The main body is formed in this embodiment with an angled side (10) to accept angled insert (1) constructed of a heat and/or electrically resistant material such as aluminum or ceramic for cutting material at an angle to facilitate further processing and welding. A torch head clearance relief groove (9) is defined by the insert (1), which allows for a large diameter torch head assembly to clear the guide whilst on an angle. A plurality of slag diversion slots (8,11, 12) are also defined by the inserts, which allow room for spatter that flashes up from the cutting process to be pushed aside by the cylindrical shape of the cutting head into this clearance/relief area, as graphically indicated. This serves to prevent such undesirable effects like longitudinal deflection that might occur otherwise.

Underneath the main body (2), friction enhancing strips are preferably provided to enhance stability over the given work piece. The friction enhancing strips (13,14) may be constructed of any suitable material. For example, they may be constructed of a sticky heat resistant material such as silicon, or of a suitable magnetically charged strip which affords temporary attachment to a ferrous work piece during cutting or positioning. The friction enhancing strips (13,14) are preferably received in recessed manner within associated channels formed in the main body extrusion.

Each guide insert is preferably also formed to define a tip relief (12) which allows for some accumulation of surface slag from the cutting action to accumulate out of the way. Some of the slag may therefore remain on the work piece surface, without hindering the plasma torch tip or the electrical current it uses to create the plasma (for example, the threat of electrically shorting the tip). Note in this regard that a torch tip typically has a voltage bias applied to it in order to aid the plasma creation process. This creates the possibility of generating a current path to the work piece that is an alternate to the desired work path of the current occurring directly in the plasma stream itself. What typically results, then, is uneven torch wear should the tip be permitted to contact the slag collecting around the opening of the cut. The angular recess (12) allows for the slag generated by the cutting process to accumulate out of the way, so as to avoid the shorting the electrical path through the plasma guide onto the work piece itself.

The recess (12) could be configured in a plurality of suitable ways that would aid different tips both electrically and aerodynamically, by affecting the eddy's that form as a result of large volumes of gases exiting the torch head at relatively high speeds. The slag is thereby urged to collect within the recess in much the same way a venturi vacuum separator functions. The guide surfaces of the inserts (1,3) are disposed to extend along the length of the torch body above and against the slag diversion slots (11,12) in such manner as to conform to and maintain substantially uniform contact with the side profile of the torch head. This yields stability, electrical isolation, slag diversion, and other desirable results during operation.

Figure 4:
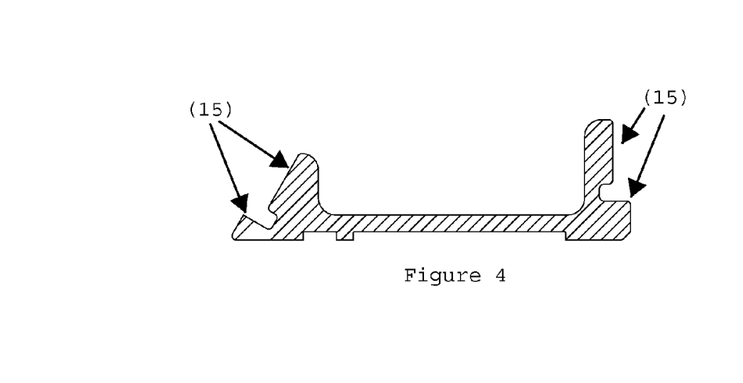
FIG. 4 is a cross sectional view of another alternate embodiment of a plasma guide formed as a monolithically integrated structure (15) having both an angled guide and a perpendicular guide.

FIG. 4 illustrates an integrally formed single extrusion configuration of a plasma torch guide fence system in accordance with an alternate embodiment of the present invention. The torch guide incorporates guide surfaces (15) into a single body without the use of separately constructed removable replaceable inserts. The built-in plasma torch interface/guide surfaces (15) allow for a disposable fence unit built for a specific set of plasma torches.

Figure 5:
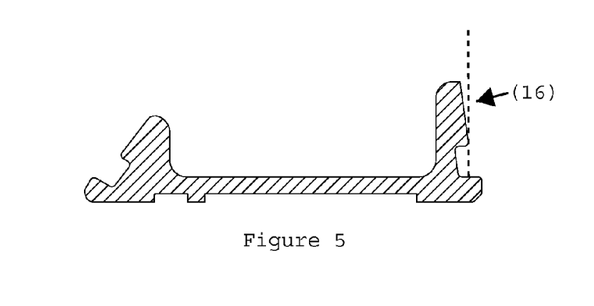
FIG. 5 is a cross sectional view of a further alternate embodiment of a plasma guide formed as a monolithically integrated structure, particularly well suited for an angled torch body with a large slag diversion/clearance slot.

FIG. 5 illustrates another embodiment similar to FIG. 4. The plasma torch guide fence system in this embodiment is monolithically formed with a modified torch interface (16) (as compared to the embodiment of FIG. 4), which departs from a perpendicular angle, indicated by the dotted line. This embodiment serves to accommodate torch bodies with a conical contour such that the plasma stream might be held perpendicular to the work piece despite the irregular bodily dimensions and/or configurations. The interface/guide surface (16) is angled slightly from vertical to accommodate such different plasma torch head configurations.

Figure 6:
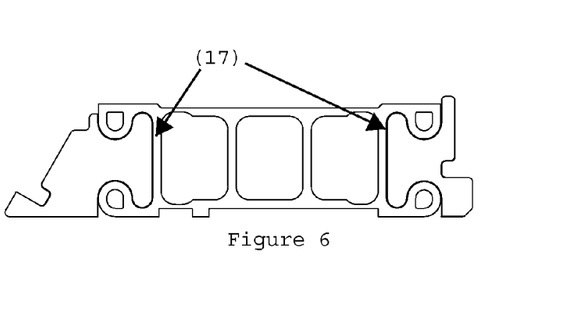
FIG. 6 is a cross sectional view of the embodiment illustrated in FIG. 1, of a multi cavity main body with vertically parallel interlocking grooves (17) for retaining each guide insert, the grooves being disposed in a substantially perpendicular orientation relative to the work piece.

FIG. 6 shows the guide inserts interlocking into a mechanical negative created by a gap (17) to control the deflection from parallel adjacent to the long axis of the plasma torch guide when unevenly heated. Such deflection would result in an inaccurate cut due to undue thermal expansion of the insert material, as could be the case when an aluminum insert is used. The gap (17) outlined by a heavy line in FIG. 6 would allow the insert material to expand unevenly, but confine that expansion in such a manner as to restrict the insert's movement perpendicularly to the long axis of the plasma torch guide. This would preserve the accuracy of cut, even as cuts of multiple or long duration cause uneven heating of the insert.

Figure 7:
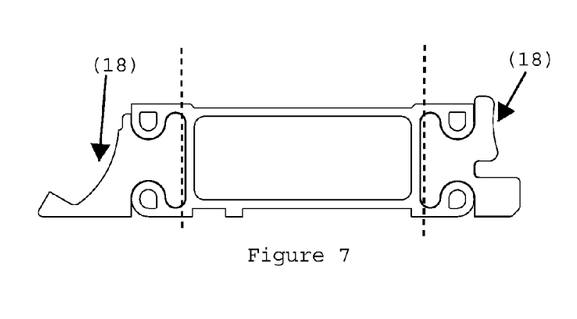
FIG. 7 is a cross sectional view of a further alternate embodiment of a single cavity main body with one guide insert configured with radii for a rounded body plasma torch.

FIG. 7 illustrates a single cavity semi symmetrically designed parallel channel main body with a radii insert (18) for irregularly shaped plasma torch bodies. This insert (18) is configured with an arcuate, concave guide surface to provide graduated, adaptive support for a given torch body's irregular contour.

Figure 8:
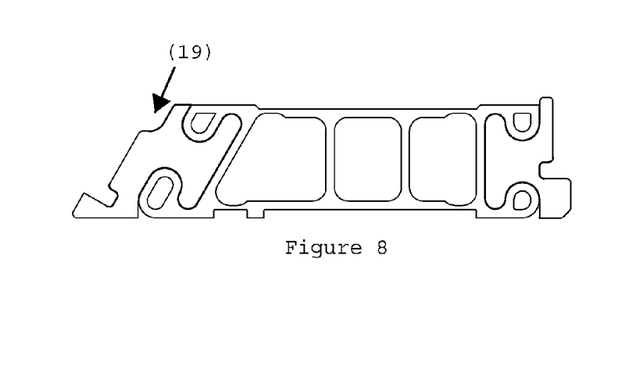
FIG. 8 is a cross sectional view of a further alternate embodiment of a multi cavity main body with an angled guide insert that has a clearance gap (19) for shortened torches.

FIG. 8 illustrates a multiple cavity main body with a plasma torch handle clearance recess (19) at an upper edge of the angled guide surface of an insert. This clearance recess allows for use of smaller torches whose handle assemblies may otherwise rest against the guide surface, disrupting the torches' conformed engagement of the guide surface when laid on an angle. The clearance recess reduces the amount by which the angled guide surface would extend peripherally beyond the torch head in such instances, so that the torches' handle assemblies may safely clear the guide surface and protrude into the clearance recess.

Figure 9:
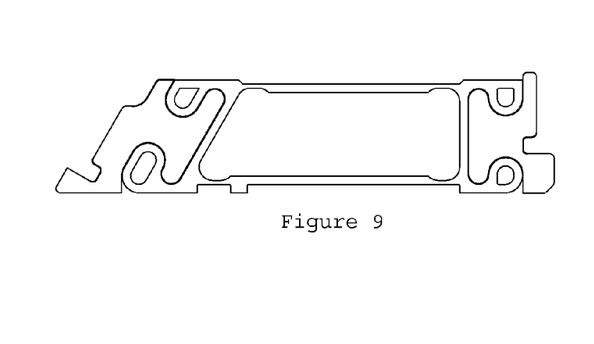
FIG. 9 is a cross sectional view of a further alternate embodiment of a single cavity main body with angled and perpendicular guide inserts.

FIG. 9 illustrates a single cavity main body similar in structure to that of FIG. 8. It is formed with thinned members and, like the embodiment of FIG. 8, with an asymmetrical design providing non parallel interlocking grooves.

Figure 10:
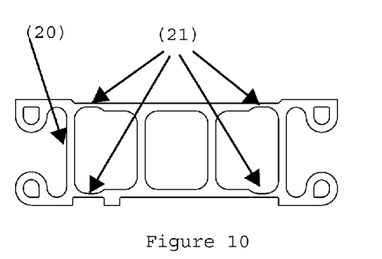
FIG. 10 is a cross sectional view of a semi symmetrical main body employed in the embodiment of FIG. 6, with thermal impingement thinning in the outer beam (21) with a thickened outer wall (20).

FIG. 10 illustrates the results of a thermal thinning technique employed by narrowing the outer channel (21) of the main body to reduce thermal transmittance and further isolate the outer interlocking structure (20) to reduce longitudinal distortion.

Figure 11:
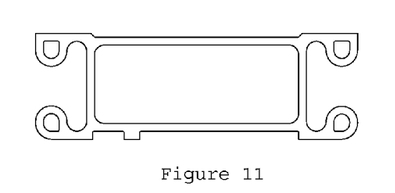
FIG. 11 is a cross sectional view of a semi symmetrical main body employed in the embodiment of FIG. 7, with no thermal thinning.
Figure 12:
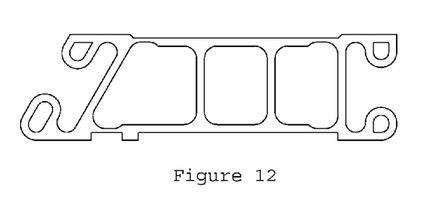
FIG. 12 is a cross sectional view of a semi symmetrical main body employed in the embodiment of FIG. 8, with thermal thinning of the outer beam structure.

FIG. 11 illustrates a sectional view of a semi symmetrical embodiment of the main body similar to that of FIG. 10, but with no thermal thinning and a single main cavity.

Figure 13:
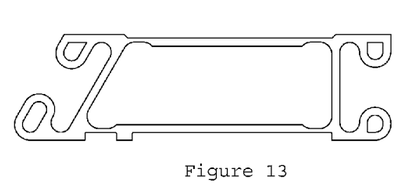
FIG. 13 is a cross sectional view of a semi symmetrical main body employed in the embodiment of FIG. 9, with thinned outer areas for thermal control.

FIG. 13 illustrates a single cavity main body formed with thermal thinning applied to reduce the longitudinal distortion.

Figure 14:
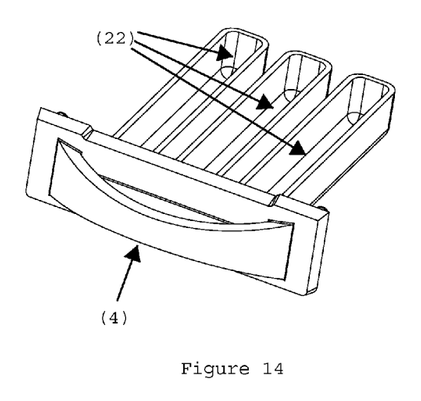
FIG. 14 is a perspective view of a composite end cap (4) employed in the embodiment of FIG. 1, with three storage bays (22).

FIG. 14 illustrates an exemplary embodiment of an end cap (4) formed with multiple storage bays (22) for vibration, dust, and contamination isolation with a large handle for easy removal with large bulk gloves. The handle (4) also acts as a shock dampening device should the assembly be dropped on the end. The storage bays (22) may serve also as a spare insert retaining member.

Figure 15:
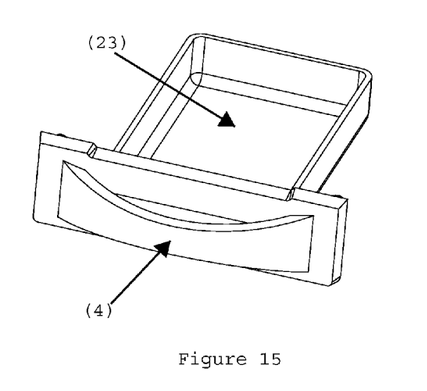
FIG. 15 is a perspective view of an alternate embodiment of the composite end cap (4) illustrated in FIG. 14, with a single main storage bay (23).

FIG. 15 is an alternate embodiment of an end cap (4) such as shown in the example of FIG. 14, but formed to define a large unitary drawer for use with a single cavity main body.

Figure 16:
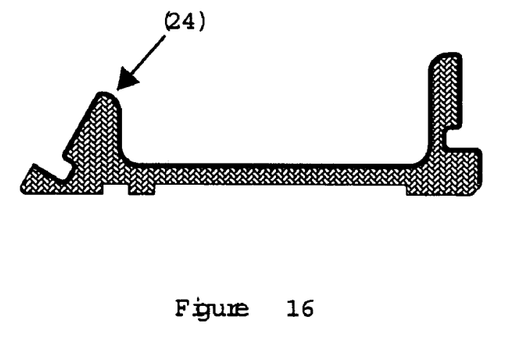
FIG. 16 is a cross sectional view of a further alternate embodiment of a plasma guide formed as a monolithically integrated structure, with a metallic surface (24) joined with a non metallic support structure (16).

FIG. 16 illustrates a main body assembly with integrated inserts. The assembly includes a nonmetallic main structure having a metallic covering or coating (24) formed thereon for electrical isolation of a given torch head from the work piece. Some plasma torch designs necessitate electrical isolation of the tip structure from the work piece to lengthen the consumable life. The metallic shell defined by the covering (24) over the insulating main body provides for heat resistance, electrical isolation, and added stability longitudinally.

Figure 17:
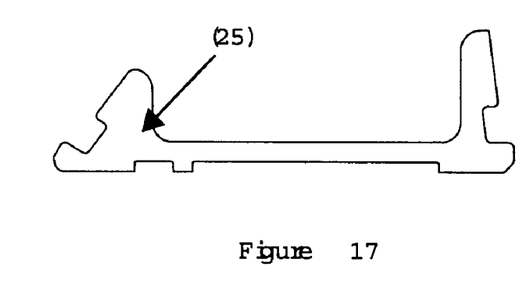
FIG. 17 is cross sectional view of another alternate embodiment of a plasma guide formed as a monolithically integrated structure, formed as a non metallic (25) composite main beam.

FIG. 17 illustrates a cross sectional view of main body assembly with integrated inserts monolithically constructed of non conductive material (25) for electrical isolation.

Figure 18:
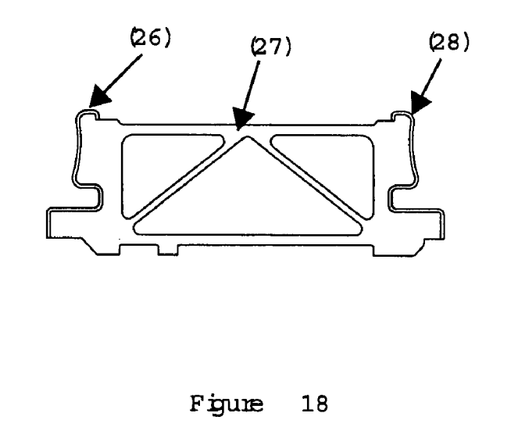
FIG. 18 is a cross sectional view of a further alternate embodiment of a semi symmetrical multi cavity main beam, with integrated metallic interface inserts (26, 28) and a central support beam (27).

FIG. 18 illustrates a multiple cavity main body/beam assembly with integrated inserts and a metallic wear surface selectively applied to areas that interface with the plasma torch contact portions for thermal and wear isolation. A bridged support (27) comprises a nonmetallic material that serves as a dielectric for electrical isolation. The bridged support (27) is formed with a load dispersing structure for clamping purposes.

Figure 19:
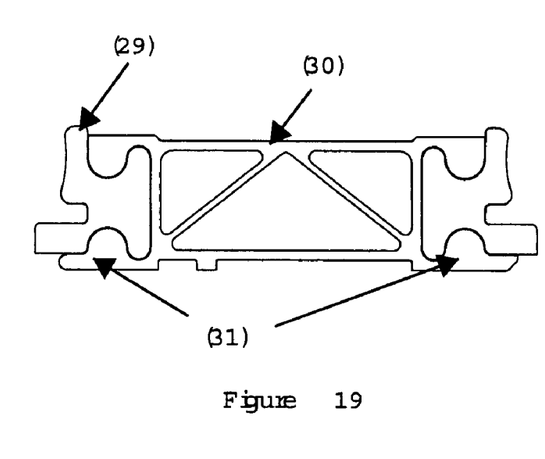
FIG. 19 is a cross sectional view of a further alternate embodiment of a semi symmetrical multi cavity main beam (30) formed of nonmetallic material, with insulating standoffs (31) for the metallic guide inserts (29).

FIG. 19 illustrates a nonmetallic multiple cavity main beam assembly (30) formed with dielectric standoffs (31) and metallic inserts (29). This embodiment preferably employs extruded thermoplastic base material with a metallic wear face attached to provide longevity and increase the ability of the guide portion to withstand the repeated heat and wear associated with plasma cutting. Additionally, should the plasma torch need to be electrically isolated from the work piece, this embodiment allows for separation of the electrical currents within the circuit that otherwise would reduce consumable life. This embodiment realizes both the advantage of electrical isolation for the main beam material and flexibility by virtue of replaceable inserts.

Figure 20:
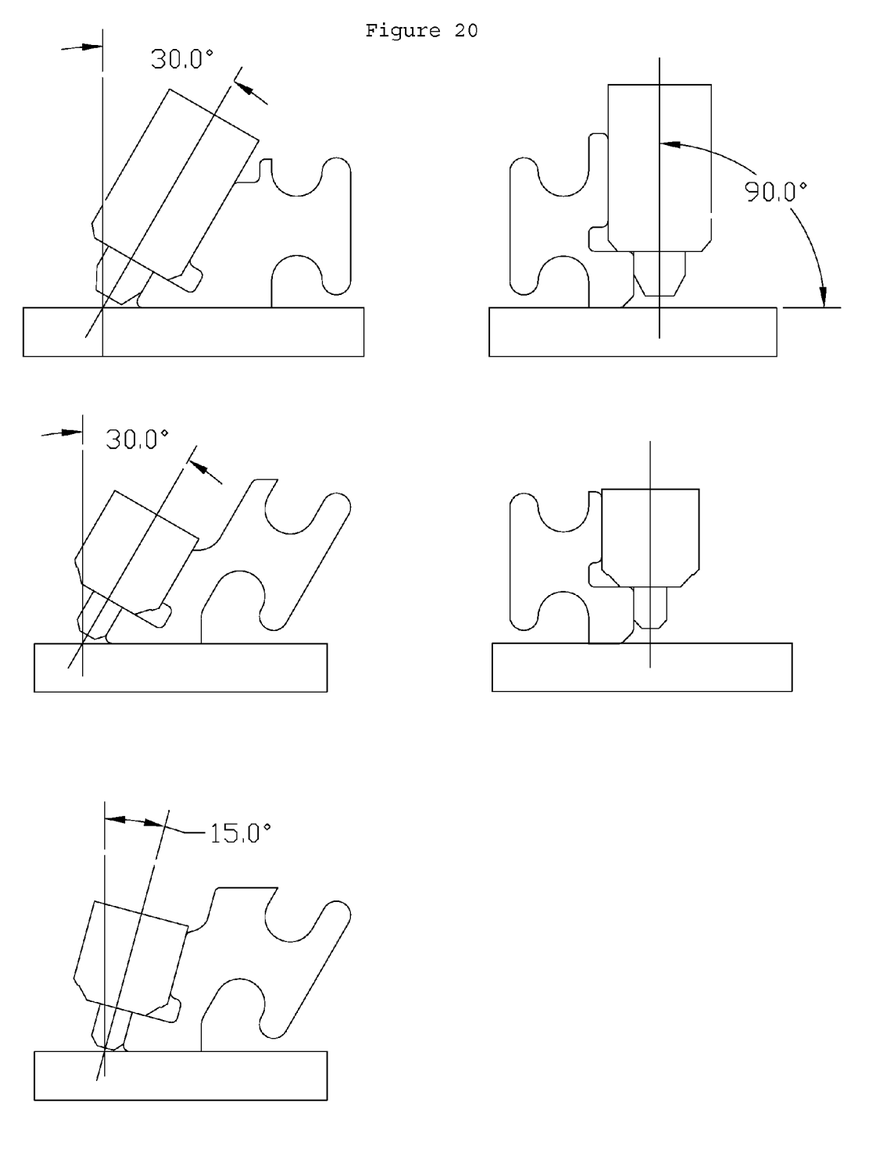
FIG. 20 is a series of schematic diagrams illustrating examples of different guide insert profiles for guiding various cutting tool head for certain exemplary applications requiring varying angles of cutting tool head to work piece alignment.

FIG. 20 illustrates several examples of insert profiles used for holding a preset angle of orientation for a torch head relative to the material being worked. The preset angles quantitatively indicated for certain of the profiles are merely shown for illustrative purposes. They are but examples of various angles which may be suitably accommodated according to the particular requirements of an intended application, and the present invention is not limited thereto. While each individual insert profile is shown in isolation, it may be incorporated either in a replaceable insert or integrated into an integrally formed main body assembly as alternatively disclosed herein, depending on the particular requirements of the intended application.

Figure 21:
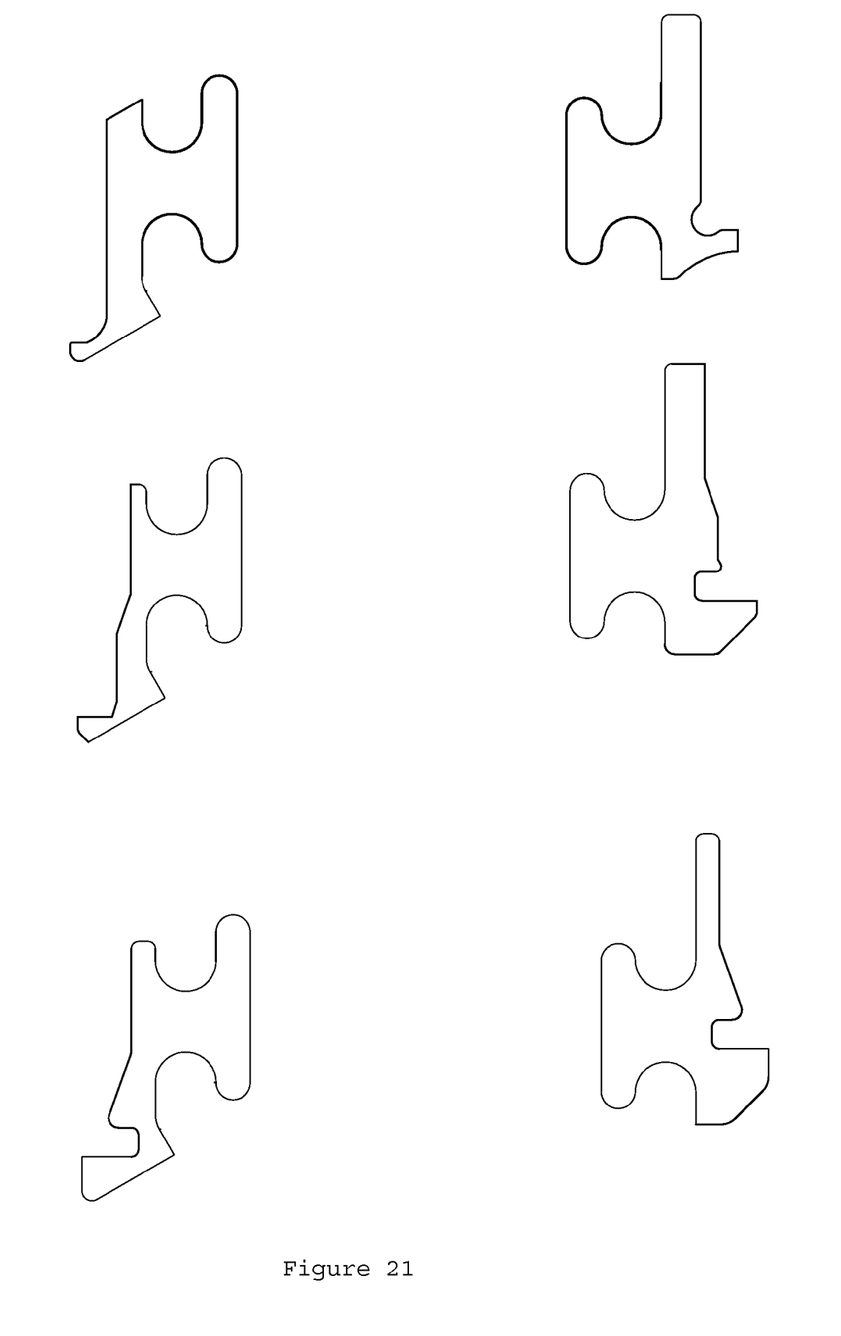
FIG. 21 is a series of schematic diagrams illustrating additional examples of guide insert profiles which may be used with a main body formed in accordance with the present invention, to accommodate a wide range of cutting tool head body styles.

FIG. 21 illustrates various additional examples of guide insert profiles which may be used with a main body suitably formed in accordance with the present invention to accommodate a wide range of cutting tool head body styles. Again, each individual insert profile may be incorporated either in a replaceable insert or integrated into an integrally formed main body assembly as alternatively disclosed herein, depending on the particular requirements of the intended application.

In accordance with certain aspects of a preferred embodiment of the present invention, therefore, plasma torch fence assembly is provided, comprising a main beam and plasma torch adapting inserts. This main beam preferably includes an extruded structural shape with exterior facing slots, in which a plasma torch adapting insert may be placed inside and securely held. The main beam may have a single cavity extruded shape with outward facing grooves in which plasma torch insert adapters may be placed. Alternatively, the main beam may have a multi-cavity extruded shape with outward facing grooves in which a mechanical negative is held without deflecting laterally while still allowing for longitudinal movement.

In certain embodiments, the body and plasma torch insert are extruded as one molded shape. The plasma torch fence assembly may be formed of material which is non metallic and serves to insulate the plasma torch electrically from the work piece. The plasma torch fence assembly may be formed with a homogeneous structure utilizing metallic wear surfaces at points that contact the plasma torch head while still allowing for electrical isolation of the plasma torch head from the work piece. As a further alternative, the plasma torch fence may include metallic wear surfaces added to extend around the perimeter, longitudinally along the outward facing plasma torch contact points, and continuing to wrap underneath the edges to provide a means for electrical contact with the work piece.

The plasma torch adapter inserts in certain embodiments may include a friction reducing coating applied thereon in whole or in part.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A fence system for guiding a cutting tool, the system comprising:
   an elongate main body portion extending longitudinally between first and second ends, said main body portion defining a longitudinally extended side; and,
   at least one guide portion disposed to extend along the longitudinally extended side of the main body;
   wherein said guide portion includes at least one member detachably coupled to said main body, said detachable member defining a guide surface sectionally contoured to support a cutting tool of preselected head profile in substantially conformed manner, said guide surface maintaining the sectional contour for slidably supporting the cutting tool longitudinally thereon;
   wherein said main body portion includes at said longitudinally extended side a receiving channel, and said detachable member of said guide portion is releasably mated to said receiving channel in inter-locking manner;
   wherein said detachable member defines said guide surface to include a side bearing region and a support shelf region protruding transversely relative to said side bearing region; said support shelf region terminating at a tapered lower edge configured to define a debris collection pocket over a work piece therebeneath; said detachable member defining said guide surface to include a debris diversion slot disposed between said side bearing and support shelf regions.

2. The fence system as recited in claim 1, comprising first and second said guide portions disposed to respectively extend longitudinally along laterally opposed sides of said main body, said guide surfaces respectively defined by said first and second guide portions being of different sectional contour.

3. The fence system as recited in claim 2, wherein said guide surface of said first guide portion is sectionally contoured to slidably support the cutting tool at a substantially perpendicular orientation, and said guide surface of said second guide portion is sectionally contoured to slidably support the cutting tool at an obliquely angled orientation.

4. The fence system as recited in claim 1, wherein said detachable member defines said guide surface to include a torch body clearance recess disposed above said side bearing region.

5. The fence system as recited in claim 1, wherein said guide surface of said detachable member is at least partially coated with a friction reducing coating.

6. The fence system as recited in claim 1, wherein said main body portion includes a substantially hollow inner core.

7. The fence system as recited in claim 1, wherein said main body portion includes at least one friction enhancing element recessed within a bottom surface thereof.

8. A fence system for guiding a cutting tool, the system comprising:
   an elongate main body portion extending longitudinally between first and second ends, said main body portion defining a longitudinally extended side; and,
   at least one guide portion disposed to extend along the longitudinally extended side of the main body;
   wherein said guide portion includes at least one member detachably coupled to said main body, said detachable member defining a guide surface sectionally contoured to support a cutting tool of preselected head profile in substantially conformed manner, said guide surface maintaining the sectional contour for slidably supporting the cutting tool longitudinally thereon;
   wherein said main body portion includes a substantially hollow inner core:
   wherein said inner core of said main body portion defines a plurality of cavities partitioned one from the other.

9. The fence system as recited in claim 8, further comprising an end cap having at least one storage tray projecting therefrom, said storage tray extending into at least one of said cavities upon said end cap engaging one of said ends of said main body portion.

10. A fence system for guiding a cutting tool, the system comprising:
    an elongate main body portion extending longitudinally between first and second ends, said main body portion defining a pair of receiving channels at laterally opposed sides thereof; and,
    at least first and second guide portions disposed to respectively extend longitudinally along said laterally opposed sides of said main body portion, each of said first and second guide portions including at least one insert member releasably mated to one said receiving channel of said main body portion in inter-locking manner, said insert member defining a guide surface sectionally contoured to support a cutting tool of preselected head profile in substantially conformed manner for slidable displacement longitudinally therealong, said guide surfaces of said first and second guide portions being of different sectional contour;
    wherein said guide surface of said first guide portion is sectionally contoured to slidably support the cutting tool at a substantially perpendicular orientation, and said guide surface of said second guide portion is sectionally contoured to slidably support the cutting tool at an obliquely angled orientation;
    wherein said guide surface is formed to include a side bearing region, a support shelf region, and a debris diversion slot disposed therebetween, said support shelf region protruding transversely relative to said side bearing and terminating at a tapered lower edge configured to define a debris collection pocket over a work piece therebeneath.

11. The fence system as recited in claim 10, wherein at least one said insert member defines said guide surface thereof to include a torch body clearance recess disposed above said side bearing region.

12. The fence system as recited in claim 10, wherein said guide surface of at least one said insert member is at least partially coated with a friction reducing coating.

13. The fence system as recited in claim 10, wherein said main body portion includes a substantially hollow inner core defining a plurality of cavities partitioned one from the other.

14. The fence system as recited in claim 13, further comprising an end cap having at least one storage tray projecting therefrom, said storage tray extending into at least one of said cavities upon said end cap engaging one of said first and second ends of said main body portion.

15. An adaptively reconfigurable fence system for guiding a cutting tool, the system comprising:

an elongate main beam formed of a metallic material about a substantially hollow inner core, said main beam extending longitudinally between first and second ends, said main beam defining a pair of receiving channels at laterally opposed sides thereof;

replaceable first and second guide portions disposed to respectively extend longitudinally along said laterally opposed sides of said main beam, each of said first and second guide portions including at least one insert member in releasable dovetailed engagement with one said receiving channel of said main beam, said insert member defining an external guide surface having one of a plurality of preselected sectional contours to support a cutting tool of corresponding head profile in substantially conformed manner for slidable longitudinal displacement therealong; and,     at least one end cap detachably coupled to one of said first and second ends of said main beam;

wherein said guide surface of said first guide portion is sectionally contoured to slidably support the cutting tool at a substantially perpendicular orientation, and said guide surface of said second guide portion is sectionally contoured to slidably support the cutting tool at an obliquely angled orientation;

wherein said guide surface is formed to include a side bearing region, a support shelf region, and a debris diversion slot disposed therebetween, said support shelf region protruding transversely relative to said side bearing and terminating at a tapered lower edge configured to define a debris collection pocket over a work piece therebeneath;

wherein said end cap forms includes at least one storage tray projecting therefrom, said storage tray extending into at least one cavity formed by the inner core of said main beam upon said end cap engaging one of said first and second ends of said main beam.

16. The fence system as recited in claim 15, wherein at least one said insert member defines said guide surface thereof to include a torch body clearance recess disposed above said side bearing region.

\* \* \* \* \*